United States Patent

Burgess et al.

[11] Patent Number: 5,427,159
[45] Date of Patent: Jun. 27, 1995

[54] COUNTERTOP FINISHING APPARATUS

[75] Inventors: Andrew P. Burgess; Paul B. Burgess, II, both of Fall Creek, Wis.

[73] Assignee: Countertops, Inc., Eau Claire, Wis.

[21] Appl. No.: 178,407

[22] Filed: Jan. 6, 1994

[51] Int. Cl.6 .......................... B27B 1/00; B27C 9/00
[52] U.S. Cl. ..................................... 144/3 R; 29/468; 29/564.7; 100/93 P; 83/169; 83/177; 156/258; 156/353; 156/356; 144/2 R; 144/134 R; 144/345; 144/356; 409/291; 409/300
[58] Field of Search ...................... 29/468, 469, 564.7; 51/100, 110, 122, 127; 83/169, 170, 177; 100/92, 93 P, 137, 197, 216, 217 R, 267; 144/1 R, 2 R, 3 R, 3 A, 3 B, 3 C, 134 R, 344, 345, 356, 363, 364, 373, 380, 375

[56] References Cited

U.S. PATENT DOCUMENTS

| | | | |
|---|---|---|---|
| 2,748,046 | 5/1956 | Works et al. | 154/116 |
| 3,283,052 | 11/1966 | Munk | 264/248 |
| 3,371,003 | 2/1968 | Goldman | 156/267 |
| 3,398,641 | 8/1968 | Breske et al. | |
| 3,535,981 | 10/1970 | Gagne | 144/144 R |
| 3,642,040 | 2/1972 | Brandt | 144/144 R |
| 3,833,036 | 9/1974 | Marvosh | 144/144 R |
| 3,972,766 | 8/1976 | Fontvieille | 156/358 |
| 4,142,444 | 3/1979 | Draper | 144/144 R |
| 4,221,514 | 9/1980 | Pavlovsky | 409/291 |
| 4,374,693 | 2/1983 | Pitt | 156/267 |
| 4,543,147 | 9/1985 | Noto et al. | 156/288 |
| 4,776,919 | 10/1988 | Troutner et al. | 156/499 |
| 4,787,786 | 11/1988 | Freud et al. | 409/180 |
| 4,846,925 | 7/1989 | Ishida et al. | 156/583.1 |
| 5,144,737 | 9/1992 | Riesmeier | 29/564.7 |

Primary Examiner—W. Donald Bray
Attorney, Agent, or Firm—Westman, Champlin & Kelly

[57] ABSTRACT

A countertop finishing apparatus includes a base for supporting the countertop. A press is arranged to press an end piece against an end of the countertop. A trimming head is provided with an automatic positioner for automatically moving the trimming head relative to the base to cut the end piece of the countertop to a desired size.

22 Claims, 4 Drawing Sheets

COUNTERTOP FINISHING APPARATUS

BACKGROUND OF THE INVENTION

The present invention relates to a machine for making countertops. More specifically, the present invention is a machine for finishing countertops by assembling an end piece on the countertop and cutting the end piece to a desired size.

Countertops are traditionally made of wood or pressed wood, covered by a veneer or laminate material. Hot melt glue is applied to a back surface of the laminate material. The laminate material is then pressed against the wood or pressed wood portion of the countertop and becomes fixedly attached to the countertop.

Conventional countertops are covered by the laminate material on a top surface, and on at least one end surface and sometimes both end surfaces. In the past, the end pieces of the laminate material were coated with hot melt glue, and then placed against the end of the countertop to be covered by the end piece. Gluing pressure was manually applied to the end piece. An assembler would hold the end piece adjacent the end of the countertop, and roll a roller back and forth across the end piece, applying pressure to the end piece for one to two minutes until the hot melt glue set and glued the end piece to the end of the countertop.

It is also common in assembling countertops that the end pieces of laminate material are larger than required. Therefore, after the end pieces have adhered to the countertop, the laminate end pieces must be trimmed to a desired size. This often requires trimming on either three or four sides. In the past, this trimming was done manually by an assembler after the hot melt glue had set and the end piece was glued to the end of the countertop.

The laminate material is also typically rather sensitive to heat and could thus burn or discolor from the heat generated by a bit in a trimming head. Therefore, in past manual assembly methods, the assembler would not only need to manually trim the end piece to a desired size, but was also required to manually apply lubricant along the cutting path of the trimming head so that the trimming head did not build up enough heat to burn or discolor the laminate surface along the cutting path. The assembler typically applied a mist of lubricant by using an aerosol spray can.

This conventional manual assembly method, including manual application of lubricant, manual application of gluing pressure, and hand trimming of the end pieces of the countertop, is both costly and very time consuming. Further, such a manual assembly method is prone to human errors resulting in a lower quality product.

SUMMARY OF THE INVENTION

The present invention is a countertop finishing apparatus. The apparatus includes a base for supporting the countertop. Press means is included for automatically pressing an end piece against an end of the countertop. Attachment means, coupled to the end piece, attaches the end piece to the end of the countertop. Trimming means are provided for cutting the end piece, and automatic positioning means automatically moves the trimming means relative to the base to cut the end piece to a desired size.

DETAILED DESCRIPTION OF THE PREFERRED EMBODIMENTS

Figure 1:
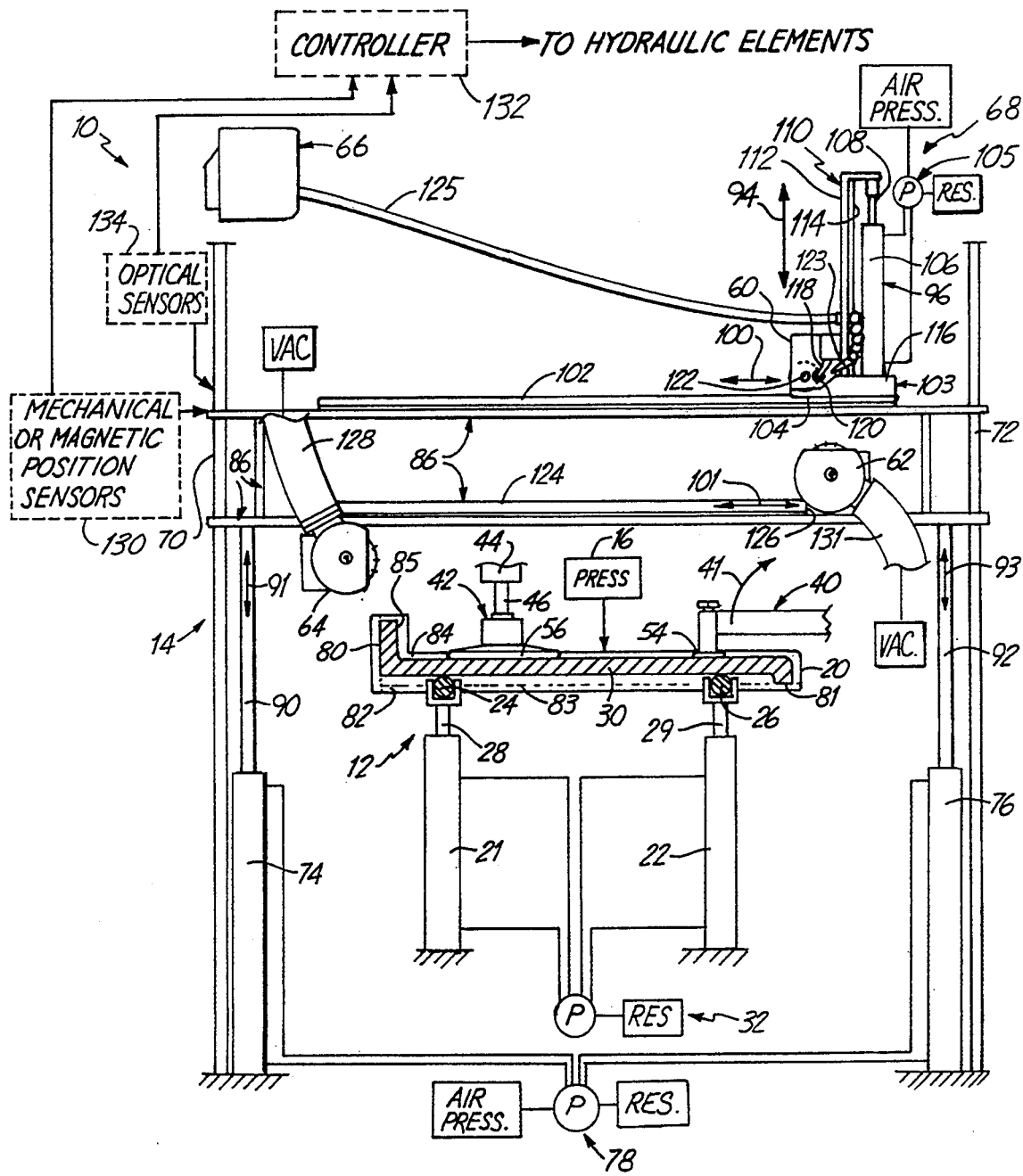
FIG. 1 is a schematic diagram of a countertop finishing apparatus according to the present invention.

FIG. 1 shows a diagrammatic view of a countertop finishing apparatus 10 according to the present invention. Countertop finishing apparatus 10 includes holding and leveling mechanism 12, movable head assembly 14 and press 16. Holding and leveling mechanism 12 securely holds and levels a countertop piece for finishing. Press 16 presses an end piece 20 against an end of countertop 30 until it is rigidly attached to countertop 30. Movable head assembly 14 supports a plurality of trimming heads 60, 62 and 64 relative to the countertop 30 and moves the heads to trim the end piece 20 to a desired size.

Holding and leveling mechanism 12 supports countertop piece 30 so that end piece 20 can be affixed to an end of countertop piece 30 and trimmed to a desired size. Leveling mechanism 12, in this preferred embodiment, includes hydraulic cylinders 21 and 22, and leveler bars 24 and 26. Hydraulic cylinders 21 and 22 include pistons 28 and 29, which reciprocate within cylinders 21 and 22, respectively. Pistons 28 and 29 are coupled, at their upper ends, to leveler bars 24 and 26, respectively. Cylinders 21 and 22, and consequently pistons 28 and 29, are driven by an air-over-hydraulic system 32 actuable by an on/off switch (not shown). When cylinders 21 and 22 are actuated, the air-over-hydraulic system 32 causes pistons 28 and 29 to extend from within cylinders 21 and 22. This, in turn, causes leveler bars 24 and 26 to be raised a distance equal to the stroke length of pistons 28 and 29. Thus, an operator of countertop finishing apparatus 10 can actuate cylinders 21 and 22 when one of the ends of the countertop piece 30 is required to be raised prior to finishing. Leveler bars 24 and 26 may be used for a number of reasons. For example, if the portion of countertop 30 being assembled requires only one end piece 20, then the end requiring the end piece 20 is approximately three-quarters of an inch thicker than the end which does not require the end piece 20. In such a case, the air driven leveler bars 24 and 26 are engaged to lift the end which does not require the end piece so that the countertop 30 is level.

In addition, leveling mechanism 12 includes clamp 40 and hydraulic clamp 42. Once the operator places the countertop piece 30 on leveler bars 24 and 26, the operator then pivots clamp 40 into position over the countertop 30 and lowers clamp 40 to hold the countertop 30 in place for finishing. Clamp 40 is pivotal toward and away from the leveler bars 24 and 26 along arc 41.

Clamp 42 is hydraulically actuated. Clamp 42 is controlled by an air-over-hydraulic system which may be system 32 or a separate system. However, clamp 42 has its own hydraulic cylinder 44 and piston 46, reciprocable within cylinder 44. Clamp 42 is also pivotal with respect to leveler bars 24 and 26 in an orientation into and out of the page in FIG. 1. Thus, once the operator places countertop piece 30 on leveler bars 24 and 26, the operator simply pivots clamp 42 into a position over countertop piece 30 and actuates hydraulic cylinder 44. This causes piston 46 to extend from within cylinder 44, thereby exerting pressure against countertop piece 30. Clamps 40 and 42 preferably have clamping heads 54 and 56 which are coated with a rubber coating, or other nonabrasive coating so that countertop piece 30 is not scratched when clamps 40 and 42 engage countertop piece 30.

Figure 2:
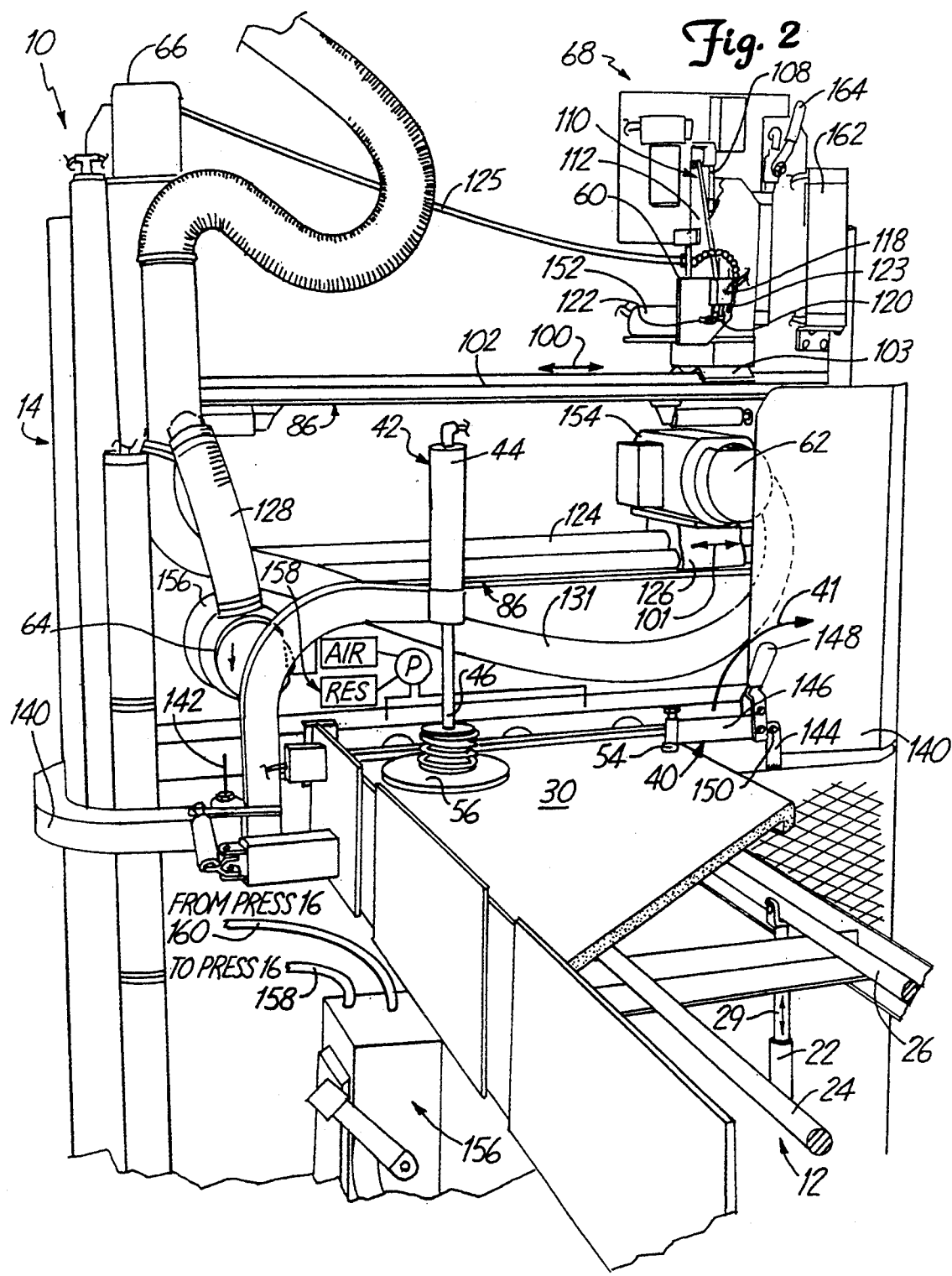
FIG. 2 is an elevational view of the countertop finishing apparatus of FIG. 1, with portions cut away.
Figure 3:
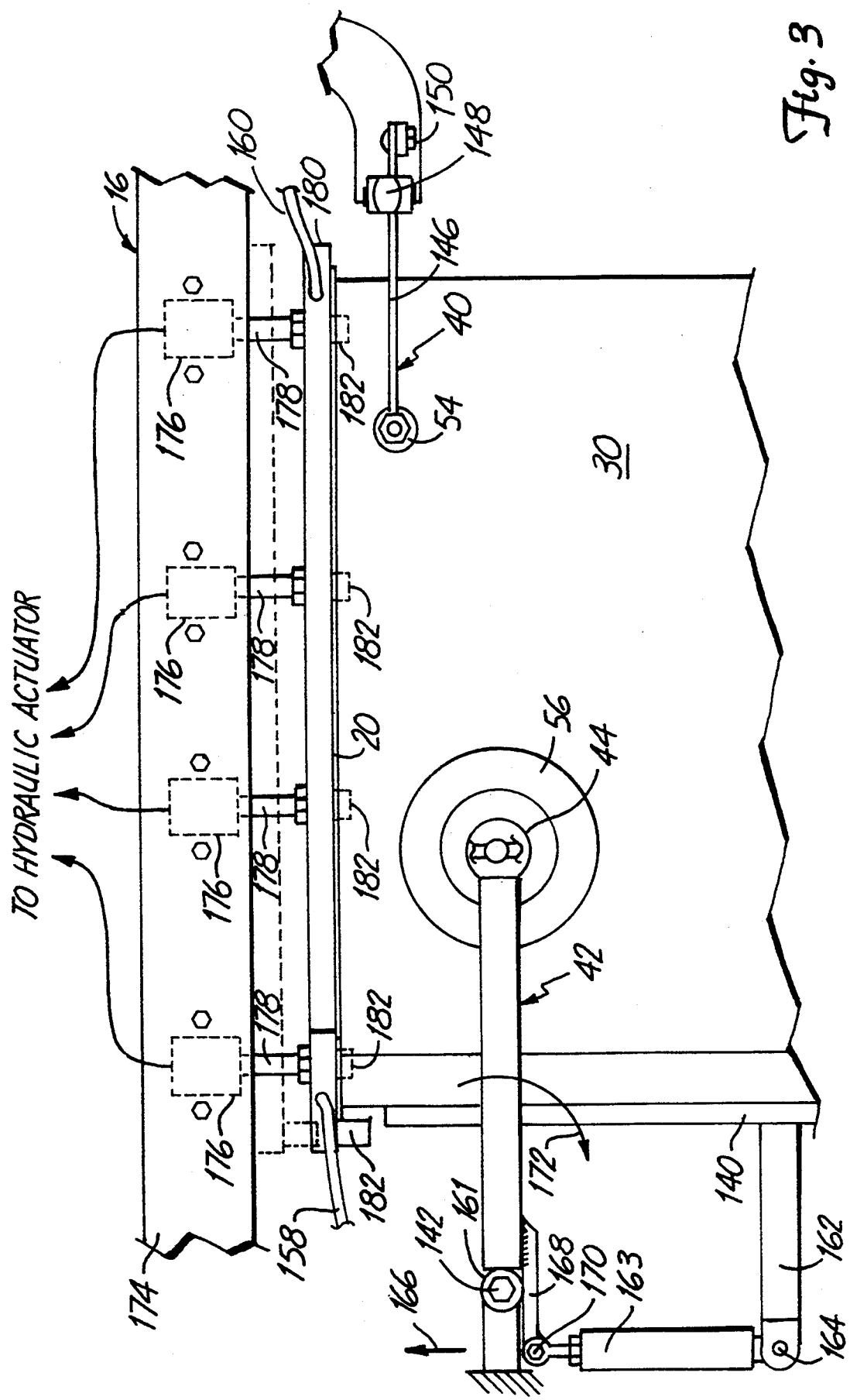
FIG. 3 is a more detailed diagram of a hydraulic press implemented in the countertop finishing apparatus of the present invention.

Press 16 in shown in block diagram form in FIG. 1, and is shown in greater detail in FIGS. 2 and 3. Press 16 includes a mechanism for holding end piece 20 and an actuable press, for pressing the end piece against the end of the countertop piece 30. In a preferred embodiment, the end piece 20 has a contact surface which is coated with hot melt glue, and press 16 presses the contact surface against an end of countertop piece 30 until the hot melt glue sets and end piece 20 is rigidly attached to countertop piece 30.

It is common that the end piece 20 must be trimmed to a desired size before the countertop is finished. Movable head assembly 14 is used for trimming the end piece 20 to the desired size. Movable head assembly 14 includes top trimming head 60, bottom trimming head 62, and rear trimming head 64. Head assembly 14 also includes lubricant reservoir and delivery system 66, hydraulic actuator mechanism 68, associated with head 60, guide rails 70 and 72, and hydraulic cylinders 74 and 76. Hydraulic cylinders 74 and 76 are preferably controlled by air-over-hydraulic actuator mechanism 78.

It is common for a rear portion 80 of the end piece 20 to project beyond the rear of countertop 30 as shown in FIG. 1. Similarly, a bottom edge 82 of the end piece 20 commonly projects down beyond a desired point 83 relative to the countertop 30. Finally, a top edge 84 also commonly projects above the top planar surface of the countertop 30 in an undesirable manner. Thus, it is common for all three of these edges 80, 82 and 84 to require trimming to achieve a countertop having an end piece of a desired size. In one preferred embodiment of the present invention, all three trimming heads, 60, 62 and 64 are mounted to a frame portion 86 on the head assembly 14. The frame portion 86, in turn, is mounted to pistons 90 and 92 which reciprocate within hydraulic cylinders 74 and 76. Thus, actuation of hydraulic cylinders 74 and 76 causes all three trimming heads to move in the vertical direction indicated by arrows 91 and 93.

Similarly, in the preferred embodiment, trimming heads 60 and 62 are movably mounted to frame 86. Trimming head 60 is mounted, by a mounting assembly 96, which permits trimming head 60 to move along the vertical axis indicated by arrow 94, and along the horizontal axis indicated by arrow 100, relative to frame 86. Trimming head 62 is mounted for movement in the horizontal direction, indicated by arrow 101, relative to frame 86. Trimming head 64 remains rigidly attached to frame 86.

In the embodiment shown in FIG. 1, the mounting assembly which mounts trimming head 60 to frame 86 for movement in the horizontal direction is mounted via slide rail assembly 103. Slide rail assembly 103 includes a pair of slide rails 102, and bearing surface 104. Slide rails 102 and bearing surface 104 can be any commercially available slide which is suitable for the purpose. In one preferred embodiment, trimming heads 60 and 62, and their corresponding motor assemblies, are driven along the slide bars 102 by an apparatus commonly known as a cable cylinder. While other mechanisms for driving trimming heads 60 and 62 could be used, such as a dove tail way linear bearing, a sliding way linear bearing, or ball-screw drive mechanism, the cable cylinder is a preferred embodiment due to its size and driving capabilities.

Mounting assembly 96 associated with head 60 also preferably has a separate hydraulic actuator mechanism 105. The hydraulic mechanism 105 includes hydraulic cylinder 106 and piston 108. Trimming head 60 is mounted to piston 108 via a slide bracket 110, which includes a first member 112 rigidly attached to piston 108 and rigidly attached to head 60. First member 112 is slidably attached to a second member 114 which is rigidly attached to a base portion 116. Thus, actuation of the hydraulic mechanism 105 causes piston 108 to drive trimming head 60, via slide bracket 110, in the vertical direction relative to frame 86, as indicated by arrow 94.

Hydraulic cylinder 106 and piston 108 are coupled to a contour following position switch 118. Switch 118 includes rollers 120 which follow a contour to be milled or trimmed (such as the upper planar surface of countertop 30). As the contour changes, the rollers 120 on switch 118 cause the position of the switch 118 to change. This change in position causes controllable actuation of the hydraulic positioning mechanism 105. In this preferred embodiment, trimming head 60 makes desired trimming cuts using a router bit 122. Bit 122 is preferably a solid carbide 7½ degree bevel bit. Trimming head 62 is movably coupled to frame 86 for movement in the horizontal direction indicated by arrow 101. In the preferred embodiment, trimming head 62 is coupled for horizontal movement utilizing slide rails 124 and slide assembly 126 via a cable cylinder or other mechanism similar to trimming head 60. The bit in trimming head 62 is preferably an insert cutter head.

The mounting assembly 68 associated with trimming head 60 is also provided with lubricant dispensing nozzle 123 which is coupled to hose 125 which is, in turn, coupled to lubricant reservoir 66. Dispensing nozzle 123 is coupled proximate router bit 122 so that nozzle 123 dispenses lubricant just ahead of the router bit 122 as a cut is being made to end piece 20. The system used for dispensing the liquid lubricant is, in this preferred embodiment, a commercially available mist lubricator. The mist lubricator should dispense any suitable, commercially available non-marring lubricant.

Trimming head 64 is rigidly coupled to frame 86. The bit in trimming head 64 is preferably an insert cutter head. It is also worth noting that heads 62 and 64 are coupled proximate vacuum hoses 128 and 131. A vacuum is created by a suitable vacuum mechanism coupled to hoses 128 and 131 so that sawdust created by heads 62 and 64 is removed while heads 62 and 64 are cutting.

In operation, an operator first places countertop 30 on top of the leveler bars 24 and 26 and clamps the countertop 30 in place with the clamps 40 and 42. If actuation of the hydraulic cylinders 21 and 22 attached to the leveler bars 24 and 26 is required to level countertop 30, the operator actuates the hydraulic cylinders 21 and 22 to locate the leveler bars 24 and 26 accordingly.

Once the countertop 30 is in place and leveled, the operator places the end piece 20 in a receiving notch located on press 16 (which will be described in detail later in the specification). The operator then controls press 16 to press the end piece 20, which had previously been coated with hot melt glue, against the end of countertop 30. Once the glue sets, and the end piece 20 is rigidly attached to countertop 30, press 16 withdraws leaving end piece 20 attached to countertop 30, and the operator controls head assembly 14 to move frame 86 (and consequently trimming heads 60, 62, and 64) downward. Head 64 is located relative to countertop 30 so that it trims the rear edge 80 of the end piece 20 flush with the rear edge of countertop 30, as moveable head assembly 14 moves downward. Once the rear edge 80 is cut, head assembly 14 is controlled to move frame 86 vertically to a position which locates head 62 adjacent the bottom surface of countertop 30. For countertops having a profile requiring trimming of the bottom 82 of the end piece 20, head 62 is then controlled to move in the horizontal direction, indicated by arrow 101, across the whole width of countertop 30. Head 62 thus trims the bottom edge 82 of the end piece 20 along line 83 so that it is flush with a bottom lip portion 81 of countertop 30.

Finally, head assembly 14 again moves in the vertical direction until the router bit 122 in head 60 is just below and adjacent bottom lip portion 81 of countertop 30. In this position, contour following switch 120 is positioned to cause the hydraulic actuator mechanism 105 associated with head 60 to move head 60 upward in a vertical direction. Head 60 thus trims the front lip portion of countertop 30. As the router bit in head 60 moves upward, switch 122 follows the contour of the upper planar surface of countertop 30 causing vertical movement of head 60 to stop. Head 60 then begins horizontal movement along slide rails 102 toward the rear edge of countertop 30. In this way, the router bit 122 associated with head 60 trims the end piece 20 along the entire upper planer surface of countertop 30.

When the bit 122 in head 60 reaches rear vertically protruding lip 85 of countertop 30, switch 120 is again tripped to cause hydraulic actuator mechanism 68 to move head 60 in the vertical direction, thus following the vertical lip face of lip 85 on countertop 30. As the bit 122 in head 60 reaches the upper edge of the vertically protruding lip portion 85 of countertop 30, switch 122 is again actuated causing hydraulic actuator mechanism 68 to discontinue vertical movement of head 60. Head 60 then begins to move horizontally finishing its cut. During the entire cutting stroke of head 60, lubricant reservoir 66 provides lubricant to spraying nozzle 123. The nozzle 123 thus applies lubricant to the surface of countertop 30 and the end piece 20 so that no burning or discoloration occurs due to the action of head 60.

The positioning of head assembly 14 and trimming heads 60, 62, and 64 can be accomplished in any number of ways. In one preferred embodiment, mechanical or magnetic position switches 130 (shown in phantom in FIG. 1) are located on frame 86 and on a housing which is fixed relative to frame 86, or on guide bars 70 and 72. As frame 86 moves relative to the housing or guide bars 70 and 72, the mechanical or magnetic switches 130 are tripped causing the movement of head assembly 14 to stop its horizontal movement until the desired operation is complete. Such a positioning mechanism also includes magnetic switches on the slide rails 102 and 124 associated with heads 60 and 62 and a controller 132 (shown in phantom in FIG. 1). Controller 132, in this preferred embodiment, is either hardwired logic or a digital computer. In either case, signals from sensors 130 are fed back to controller 132 so that each trimming step is monitored. Upon completion, the head assembly 14 is moved into position for the next trimming step.

In another preferred embodiment, the position of head assembly 14, and heads 60 and 62, is sensed by optical sensing elements 134 (shown in phantom in FIG. 1) mounted on the frame and on the housing or guide bars 70 and 72, as well as on the slide assemblies for heads 60 and 62 and on frame 86. In the preferred embodiment in which optical sensors are used, the sensor signals are fed back to controller 132 which is a digital computer. The controller 132 then controls actuation of the hydraulic elements in countertop finishing apparatus 10 to cause desired movement of head assembly 14 and heads 60 and 62, respectively, to achieve the desired trimming operation.

FIG. 2 is an elevational view of countertop finishing apparatus 10 with portions cut away. FIG. 2 shows some features of finishing apparatus 10 in greater detail than FIG. 1, and similar items in FIGS. 1 and 2 are similarly numbered.

FIG. 2 shows that the hydraulic clamp 42 is attached to housing 140 for rotation about axis 142. Thus, the hydraulic clamp 42 starts in a position with the piston 46 retracted into the hydraulic cylinder 44. Thus, the clamping end 56 of the hydraulic clamp 42 is moved up, out of contact with countertop 30. Hydraulic clamp 42 also is pivoted back, away from the leveler bars 24 and 26.

In addition, the manually activated clamp 40 is rigidly coupled to the frame 140 by the bracket 144. The clamp 40 has a lever arm 146 which is pivotally connected to bracket 144. A handle 148 is rigidly attached to lever arm 146. The manually activated clamp 40 is initially in a position rotated about pivot point 150 as shown by arrow 41.

With the hydraulic clamp 42 pivoted away from the leveler bars 24 and 26 about axis 142, and with the manually actuated clamp 40 pivoted up along arc 41 about pivot point 150, the operator is free to place countertop 30 upon the leveler bars 24 and 26. Once the leveler bars 24 and 26 are in place, the operator pivots the manually actuated clamp 40 into its clamping position shown in FIG. 2. The operator also pivots the hydraulic clamp 42 into its clamping position, and actuates the hydraulic cylinder 44 so that the piston 46 and the clamping end 56 are driven into contact with countertop 30.

FIG. 2 also better illustrates the motors associated with cutting heads 60, 62, and 64, as well as the slides upon which motors 60 and 62 move. In the embodiment shown in FIG. 2, motor 152 drives the router bit 122 in trimming head 60. Motor 154 drives the bit in trimming head 62, and motor 156 drives the bit in trimming head 64. Also, in the embodiment shown in FIG. 2, the assembly 68 associated with trimming head 60 is driven on the pair of guide rails 102 by air-over-hydraulic cable cylinder assembly 103. Similarly, trimming head 62 and associated motor 154 are driven along the guide rails 124 by air-over-hydraulic cable cylinder assembly 126.

FIG. 2 also illustrates a cooling unit 156 which is provided to cool press 16. Press 16 is mounted to movable head assembly 14 proximate the end of countertop 30 which receives end piece 20. The movable head assembly 14 is shown in its starting position in FIG. 2. The operator places the end piece 20 in a notch located in press 16, which is described in greater detail later in the specification, and begins operation of the countertop finishing apparatus 10. The first operation is that press 16 is actuated by air-over-hydraulic system 158 shown in FIG. 1 and presses the end piece 20 against the end piece of countertop 30 until end piece 20 is attached to countertop 30. Once this is done, the entire movable head assembly 14 moves vertically downward causing head 64 to trim the rear end of the end piece 20. Head 62 is then positioned adjacent the bottom of the end piece 20 as discussed with reference to FIG. 1. This operation is the same as that described with respect to FIG. 1.

Since the end piece 20, when the operator sets it in the notch in press 16, is coated on one side with hot melt glue, and since press 16 is entirely made of metal, it conducts heat from the hot melt glue. If the finishing apparatus 10 is used frequently, press 16 could become overheated and cause operational or safety related problems due to the amount of heat conducted from numerous end pieces containing hot melt glue. Therefore, FIG. 2 shows a cooling system 156 which provides liquid cooling to press 16. The cooling system 156 is a conventional cooling system using either water or freon or another suitable liquid coolant. Cooling system 156 provides the coolant via supply hose 158 to press 16. Cooling system 156 removes the coolant by a return hose 160. In this way, cooling system 156 removes heat conducted by press 16 from the hot melt glue, keeping press 16 at a sufficiently cool temperature during operation.

FIG. 2 also more clearly shows a portion of the hydraulic mechanism 68 for operating the vertical movement of head 60. FIG. 2 shows hydraulic reservoir 162 and regulator mechanism 164 for regulating air pressure in the air-over-hydraulic system.

FIG. 3 shows a top view of a portion of countertop finishing apparatus 10, which better illustrates the pivoting movement of the hydraulically actuated clamp 42. FIG. 3 shows that sleeve 161 is rotably coupled about axis 142. A bracket 162 is rigidly coupled to a portion of the housing 140. A cylinder 163 is coupled to bracket 162, at pivot point 164. Actuation of cylinder 163 is controlled by the operator. When the operator determines that the end piece 20 has been trimmed to a desired size, and the operator wishes to remove countertop 30, the operator actuates cylinder 163 causing a piston 165, reciprocally mounted in cylinder 163, to extend in the direction indicated by arrow 166. The piston 165 is rotatably coupled to lever arm 168 at point 170. Lever arm 168 is rigidly coupled to sleeve 161. Thus, as the piston 165 extends in the direction indicated by arrow 166, lever arm 168 causes rotation of sleeve 160 about pivot point 142. This, in turn, causes the hydraulically actuated clamp 42 to rotate about point 142 in the direction indicated by arrow 172. This moves the hydraulically actuated clamp 42 away from the countertop 30 so that countertop 30 may be removed by the operator.

FIG. 3 also more clearly illustrates the operation of press 16. Press 16 includes housing 174 which is coupled to the frame 86 of the movable head assembly 14. Housing 174 houses a number of hydraulic cylinders 176. Cylinders 176 each include pistons 178, reciprocable within cylinders 176. Pistons 178 are also rigidly attached to a plate 180. Plate 180 is provided with a number of end piece support surfaces 182.

The starting position of plate 180 is shown in phantom in FIG. 3. Once plate 180 is in the starting position, the operator places the end piece 20 on the end piece support surfaces 182. Cylinders 17 are then actuated thus causing pistons 178 to extend to the position shown in FIG. 3. This causes the end piece 20, which is supported by support surfaces 182, to be pressed against the end of countertop 30. Plate 180 holds the end piece 20 against countertop 30 until the hot melt glue attaches the end piece 20 to countertop 30. The amount of time required for the glue to set up varies depending on the type of hot melt glue used for the particular countertop assembly, and on the ambient temperature. Once the end piece 20 is attached to countertop 30, cylinder 176 withdraws pistons 178, thus moving plate 180 to the position shown in phantom in FIG. 3.

Because the end piece 20 placed against plate 180 has had at least one surface coated with hot melt glue, plate 180 is capable of conducting heat from the hot melt glue and reaching dangerously high temperatures. Therefore, cooling hoses 158 and 160 are provided. As described with reference to FIG. 2, the cooling hoses 158 and 160 provide liquid coolant which is run through plate 180, removed and sent to the cooling system 156.

Figure 4:
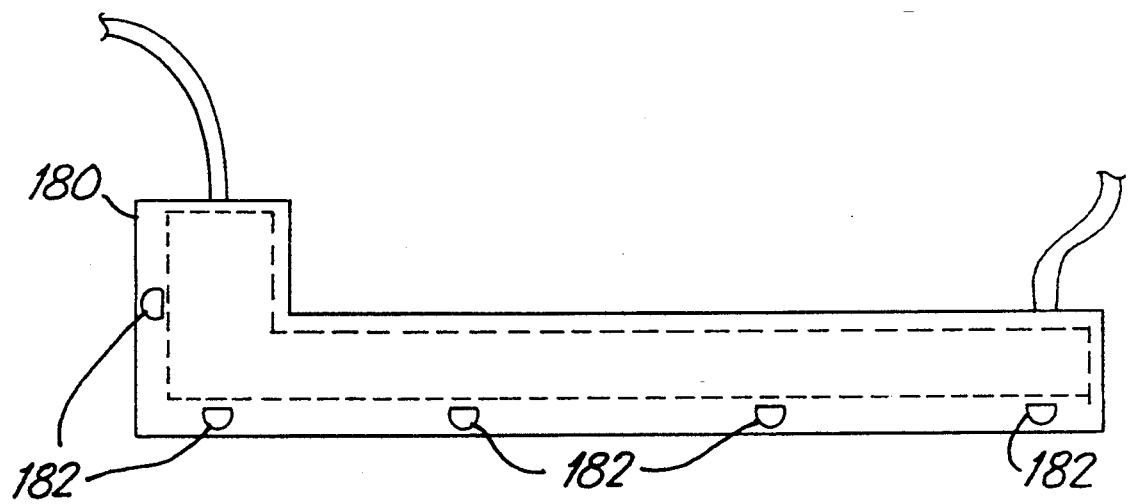
FIG. 4 is a front view of a portion of apparatus 10.

FIG. 4 shows a front view of plate 180, better illustrating the support surfaces 182. An end piece 20 of countertop 30 is shown in phantom placed against the support surfaces 182. In the preferred embodiment, support surfaces 182 are cylindrically shaped protrusions, integrally formed with plate 180 and having a flat surface for supporting end piece 20.

It should be noted that the operator can disable any of the trimming heads 60, 62 or 64. Some countertops having certain profiles do not require all of the trimming cuts to be made. Therefore, when such countertops are to be finished, the operator simply disables the certain trimming functions which are not desired by providing a necessary input to controller 132, and the countertop finishing apparatus 10 finishes the countertop appropriately.

Although the present invention has been described with reference to preferred embodiments, workers skilled in the art will recognize that changes may be made in form and detail without departing from the spirit and scope of the invention.

What is claimed is:

1. A countertop finishing apparatus comprising:
   a base for supporting the countertop;
   press means for pressing an end piece against an end of the countertop for attachment of the end piece to the end of the countertop;
   trimming means for cutting the end piece; and
   automatic positioning means, coupled to the trimming means, for automatically moving the trimming means relative to the base to cut the end piece to a desired size, the countertop remaining substantially stationary.

2. The countertop finishing apparatus of claim 1 wherein the trimming means comprises:
   a plurality of trimming heads, each trimming head provided to cut a portion of the end piece of the countertop.

3. The countertop finishing apparatus of claim 2 wherein the automatic positioning means comprises:
   a movable head assembly carrying the plurality of trimming heads, the movable head assembly being movable to position the plurality of trimming heads to cut the end piece.

4. The countertop finishing apparatus of claim 3 wherein the movable head assembly comprises:
   first movement means for moving a first of the plurality of trimming heads along a first cutting path, the first movement means providing for movement of the first trimming head along two axes of motion.

5. The countertop finishing apparatus of claim 4 wherein the automatic positioning means comprises:

second movement means for moving a second of the plurality of trimming heads along a second cutting path;

third movement means for moving a third of the plurality of trimming heads along a third cutting path; and wherein the press means is carried by the automatic positioning means, the automatic positioning means positioning the press means to press the end piece against the countertop.

6. The countertop finishing apparatus of claim 5 and further comprising;

position switch means mounted proximate the first of the plurality of trimming heads, for controlling movement of the first of the plurality of trimming heads along at least one of the axes of motion.

7. The countertop finishing apparatus of claim 6 and further comprising:

sprayer means mounted proximate the first of the plurality of trimming heads for spraying lubricant along the first cutting path as the first of the plurality of trimming heads cuts along the first cutting path.

8. The countertop finishing apparatus of claim 1 and further comprising:

leveler means, coupled to the base, for repositioning the countertop to level the countertop before the press means presses the end piece against the end of the countertop.

9. The countertop finishing apparatus of claim 8 wherein the leveler means comprises:

a leveler member, and an air over-hydraulic actuator, coupled to the leveler member, for positioning the leveler member to substantially level the countertop.

10. The countertop finishing apparatus of claim 1 and further comprising:

cooling means, coupled to the press means, for cooling the press during operation.

11. The countertop finishing apparatus of claim 10 wherein the press means comprises:

a plate, provided with an end piece supporting means for supporting an end piece, and mounted adjacent the base, for holding the end piece and pressing the end piece against the end of the countertop.

12. The countertop finishing apparatus of claim 11 where the press means further comprises:

a plurality of air-over-hydraulic cylinders, coupled to the plate, for applying pressure to the plate.

13. The countertop finishing apparatus of 2 and further comprising:

control means, coupled to the plurality of trimming heads, for independently controlling the operation of at least one of the plurality of trimming heads.

14. The countertop finishing apparatus of claim 13 and further comprising:

a vacuum apparatus, coupled proximate at least one of the plurality of trimming heads, for removing sawdust.

15. The countertop finishing apparatus of claim 14 and further comprising:

hydraulic clamping means, coupled to the base, for clamping the countertop to the base.

16. An apparatus for assembling and trimming an end piece of a countertop, the apparatus comprising:

a base portion for supporting the countertop;

support means for supporting the end piece proximate the countertop;

an automatic press mounted relative to the base portion and the support means to automatically press the end piece against an end of the countertop; and trimming means, movably mounted relative to the base portion, for trimming the end piece to a desired size, the trimming means include a plurality of trimmers, each trimmer provided for trimming a portion of the end piece.

17. The apparatus of claim 16 wherein the automatic press comprises:

an air-over-hydraulic driving means;

a plate driven by the air-over-hydraulic driving means; and cooling means, coupled to the plate, for cooling the plate during operation.

18. The apparatus of claim 16 wherein the trimming means comprises:

a trimming head assembly, movably mounted relative to the base portion, for supporting the plurality of trimmers, and for providing movement of each of the plurality of trimmers along a cutting path.

19. An apparatus for assembling and trimming a countertop, the apparatus comprising:

a base portion for supporting the countertop;

leveling means, coupled to the base portion, for repositioning an end of the countertop to substantially level the countertop;

automatic press means for supporting an end piece to be attached to an end of the countertop, and for pressing the end piece against the end of the countertop; and a plurality of trimmers, movably mounted relative to the end of the countertop, for automatically trimming the end piece to a desired size.

20. The apparatus of claim 19 and further comprising:

a trimming head assembly, coupled to the plurality of trimmers, for supporting the plurality of trimmers and providing movement of each of the plurality of trimmers along a cutting path.

21. The apparatus of claim 20 wherein the trimming head assembly comprises:

position indication means for indicating a position of the plurality of trimmers along the cutting paths and control means, for controlling movement of the plurality of trimmers along the cutting path.

22. The countertop finishing apparatus of claim 3 wherein the automatic positioning means comprises:

air-over-hydraulic drive means, coupled to the moveable head assembly, for driving movement of the moveable head assembly.

* * * * *

UNITED STATES PATENT AND TRADEMARK OFFICE
CERTIFICATE OF CORRECTION

PATENT NO. : 5,427,159
DATED : June 27, 1995
INVENTOR(S) : Andrew P. Burgess and Paul P. Burgess, II It is certified that error appears in the above-indentified patent and that said Letters Patent is hereby corrected as shown below:

In Column 9, line 56, before "2" insert --claim--.

Signed and Sealed this

Thirtieth Day of January, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,427,159
DATED : June 27, 1995
INVENTOR(S) : Andrew P. Burgess and Paul P. Burgess, II It is certified that error appears in the above-indentified patent and that said Letters Patent is hereby corrected as shown below:

Title page, item [75]: Change the name of inventor "Paul B. Burgess, II" to --Paul P. Burgess--.

Signed and Sealed this

Twelfth Day of March, 1996

*Attest:*

BRUCE LEHMAN

*Attesting Officer*  *Commissioner of Patents and Trademarks*